United States Patent [19]

Kimura et al.

[11] 4,393,183
[45] Jul. 12, 1983

[54] 2-CYANOACRYLATE ADHESIVE COMPOSITION

[75] Inventors: Kaoru Kimura, Kuroishi; Kyoji Sugiura, Nagoya, both of Japan

[73] Assignee: Toagosei Chemical Industry Co., Ltd., Tokyo, Japan

[21] Appl. No.: 329,918

[22] Filed: Dec. 11, 1981

[30] Foreign Application Priority Data

Dec. 16, 1980 [JP] Japan .................. 55-176502

[51] Int. Cl.³ .................. C08F 20/42; C08F 120/42
[52] U.S. Cl. .................. 526/245; 526/206; 526/208; 526/292.2; 526/298
[58] Field of Search ............ 526/206, 208, 298, 292.2, 526/245

[56] References Cited

U.S. PATENT DOCUMENTS

| | | | |
|---|---|---|---|
| 2,293,969 | 8/1942 | Crawford et al. | 526/297 |
| 2,467,927 | 4/1949 | Ardis | 526/297 |
| 2,776,232 | 1/1957 | Shearer et al. | 526/297 |
| 3,527,224 | 9/1970 | Rabinowitz | 526/297 |
| 3,564,078 | 2/1971 | Wicker et al. | 526/297 |
| 3,652,635 | 3/1972 | Kawamura et al. | 526/297 |
| 3,654,239 | 4/1972 | McIntire et al. | 526/297 |
| 3,692,752 | 9/1972 | Setsuda et al. | 526/297 |
| 3,836,377 | 9/1974 | Delahunty | 526/297 |
| 4,139,693 | 2/1979 | Schoenberg | 526/297 |

Primary Examiner—Harry Wong, Jr.

Attorney, Agent, or Firm—Cooper, Dunham, Clark, Griffin & Moran

[57] ABSTRACT

An adhesive composition comprising 2-cyanoacrylate and at least one compound selected from the group consisting of $R_1$—$CH_2OH$,

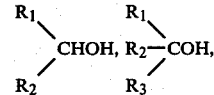

$R_1$—CHO, $R_1$—CHO hydrate,

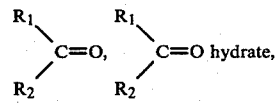

pentafluorophenol, hexachloroacetone, hexachloroacetone hydrate, chloral and chloral hydrate as cationic-polymerization inhibitor. In the above formulas, $R_1$ is a fluorinated alkyl or aryl group having up to 12 carbon atoms, and $R_2$ and $R_3$ are fluorinated or non-fluorinated alkyl or aryl groups having up to 12 carbon atoms. The above adhesive composition has an excellent storage stability and an improved bonding strength.

11 Claims, No Drawings

2-CYANOACRYLATE ADHESIVE COMPOSITION

The present invention relates to a 2-cyano acrylate adhesive composition. More particularly, it relates to a 2-cyanoacrylate adhesive composition having an excellent storage stability and an improved bonding strength.

2-Cyanoacrylate adhesives are reactive adhesives which comprise 2-cyanoacrylate monomer as the main component, and therefore, they are often cured during storage in their containers owing to the radical or anionic polymerization of 2-cyanoacrylate monomer. In order to obtain a good storage stability, a polymerization inhibitor is added to them as a stabilizer. As inhibitors for the radical polymerization of 2-cyanoacrylate monomer, there are used hydroquinone, hydroquinone monomethyl ether, catechol, pyrogallol, Bisphenol A and the like. The inhibitor is added in the range of 1 to 10,000 ppm in order to prevent the radical polymerization during storage at room temperature.

On the other hand, the anionic polymerization is initiated by a very small amount of a basic substance such as water, an amine, ammonia or the like incorporated during storage. For preventing the viscosity increase and gelation resulting from this anionic polymerization, it is known that $SO_2$, $SO_3$, $SOCl_2$, $SO_2Cl_2$, HF, $NO_2$, p-toluenesulfonic acid, methanesulfonic acid, propanesultone, phosphoric acid, sulfuric acid and the like are effective. However, the addition of these anionic-polymerization inhibitors causes the coloring of adhesive composition with time and the prolongation of the setting time thereof with time. Accordingly, anionic-polymerization inhibitors of better quality which do not cause the above problems have been desired in this field.

In view of the above need, the present inventors have made research on stabilizers which can prevent the anionic polymerization of 2-cyanoacrylate monomer. As a result, it has been found that a compound having an active hydroxyl group or a group which can be converted into an active hydroxyl group is an effective anionic-polymerization inhibitor unlike the conventional one.

According to this invention, there is provided an adhesive composition which comprises a 2-cyanoacrylate and a compound having an active hydroxyl group or a group which can be converted into an active hydroxyl group. The present invention has enabled the prevention of the reduction in the adhesive properties of 2-cyanoacrylate monomer with time during storage experienced with conventional anionic-polymerization inhibitors, namely the prevention of the coloring with time and the prolongation of setting time with time. Further, the adhesive composition according to the present invention has not only excellent storage stability, but also an improved bonding strength.

The present anionic-polymerization inhibitor for 2-cyanoacrylate monomer which has an active hydroxyl group or a group which can be converted into an active hydroxyl group is a compound possessing in the molecule fluorine or chlorine atoms and a hydroxyl, aldehyde or carbonyl group. Specifically, the following compounds are included:

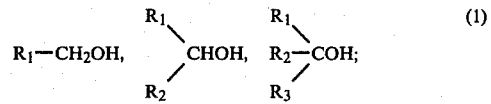

(2) $R_1$—CHO, $R_1$—CHO hydrate;

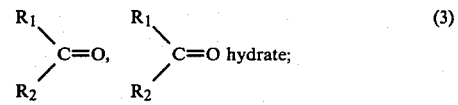

(4) pentafluorophenol;
(5) hexachloroacetone, hexachloroacetone hydrate; and
(6) chloral, chloral hydrate.

In the above formulas, $R_1$ is a fluorinated alkyl or aryl group having up to 12 carbon atoms; and $R_2$ and $R_3$ are fluorinated or non-fluorinated alkyl or aryl groups having up to 12 carbon atoms.

Among the above compounds, the compounds (1), (2), (3), (4) and (5) are preferred, and more preferable are the compounds represented by the formulas,

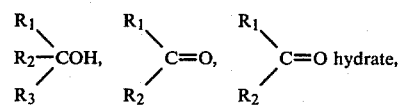

and pentafluorophenol.

Specific examples of these compounds include trifluoroethanol, 1H,1H-pentafluoropropanol, 1H,1H-heptafluorobutanol, 1H,1H-nonafluoropentanol, 1,1,1-trifluoroisopropanol, hexafluoroisopropanol, octafluoro-sec-butanol, perfluoro-tert-butanol, hexafluoro-tert-butanol, 2-trifluoromethylpropanol-2, 1-chloro-1,1,3,3,3-pentafluoro-2-propanol, 3,3,4,4,4-pentafluorobutanol-2, 3,3,4,5,5,5-hexafluoro-2-methylpentanol-2, 1H,1H,5H-octafluoro-1-pentanol, 1H,1H-pentadecafluorooctanol-1, trifluoroacetaldehyde, trifluoroacetaldehyde hydrate, heptafluorobenzaldehyde, 2,2,3,3,4,4-hexafluoro-1,5-pentanediol, pentafluorobenzyl alcohol, hexafluoroacetone, hexafluoroacetone hydrate, trifluoromethyl trichloromethyl ketone, pentafluoroethyl ethyl ketone, pentafluorophenyl methyl ketone, methyl heptafluoropropyl ketone, hexafluoro-2-phenylisopropanol, hexafluoro-2-(p-tolyl)isopropanol, pentafluorophenol, hexachloroacetone, hexachloroacetone hydrate, sym-dichlorotetrafluoroacetone and sym-dichlorotetrafluoroacetone hydrate.

Among the above specific compounds, preferable are trifluoroethanol, 1H,1H-pentafluoropropanol, 1,1,1-trifluoroisopropanol, hexafluoroisopropanol, octafluoro-sec-butanol, perfluoro-tert-butanol, hexafluoro-tert-butanol, 2-trifluoromethylpropanol-2, 3,3,4,4,4-pentafluorobutanol-2, trifluoroacetaldehyde, trifluoroacetaldehyde hydrate, heptafluorobenzaldehyde, pentafluorobenzyl alcohol, hexafluoroacetone, hexafluoroacetone hydrate, trifluoromethyl trichloromethyl ketone, pentafluorophenyl methyl ketone, methyl heptafluoropropyl ketone, pentafluorophenol, hexachloroacetone, and sym-dichlorotetrafluoroacetone. More preferable are hexafluoroisopropanol, perfluoro-tert-butanol, trifluoroacetaldehyde, trifluoroacetaldehyde hydrate, hexafluoroacetone, hexafluoroacetone hydrate and pentafluorophenol.

These compounds possess a hydroxyl group activated by electron-attractive fluorine or chlorine atoms, or, in the case of aldehyde and ketone compounds, they can be converted into compounds having active hydroxyl group as shown in the following formulas, by combining or reacting with a very small amount of water or an alcohol present in the adhesive composition:

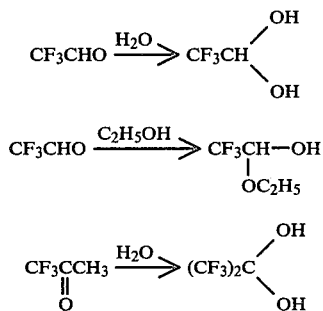

The above fluorinated or chlorinated compounds have the nature that they become acidic because of the dissociation of hydroxyl groups into H+ due to the electron attractive property of the fluorinated or chlorinated alkyl or aryl groups. Therefore, these compounds prevent the anionic polymerization of 2-cyanoacrylate monomer during storage, and accordingly, no reduction of its bonding performance with time takes place.

The 2-cyanoacrylate adhesive composition according to the present invention can be obtained by adding at least one compound selected from the above compounds (1) to (6) to a 2-cyanoacrylate monomer, preferably in a quantity of 0.1 to 10,000 ppm, more preferably 1 to 6,000 ppm. In this case, the above compound may also be used in combination with a conventional anionic-polymerization inhibitor such as $SO_2$, $SO_3$, p-toluenesulfonic acid, propanesultone or the like.

Representative examples of the 2-cyanoacrylate monomer, which is the main component of the adhesive composition according to the present invention, include methyl 2-cyanoacrylate, ethyl 2-cyanoacrylate, propyl 2-cyanoacrylate, allyl 2-cyanoacrylate, butyl 2-cyanoacrylate, heptyl 2-cyanoacrylate, hexyl 2-cyanoacrylate, octyl 2-cyanoacrylate, decyl 2-cyanoacrylate, dodecyl 2-cyanoacrylate, 2-chloroethyl 2-cyanoacrylate, methyl Cellosolve 2-cyanoacrylate, ethyl Cellosolve 2-cyanoacrylate, butyl Cellosolve 2-cyanoacrylate, benzyl 2-cyanoacrylate, phenyl 2-cyanoacrylate, trifluoroisopropyl 2-cyanoacrylate, and the like.

The adhesive composition according to the present invention may also contain a radical polymerization inhibitor in a quantity of 1 to 10,000 ppm, preferably 10 to 5,000 ppm. For example, hydroquinone, hydroquinone monomethyl ether, catechol and pyrogallol are effective.

When it is desired to thicken the present adhesive composition, a thickener such as methyl methacrylate polymer, vinyl acetate polymer, cellulose acetate isobutyrate, acrylic rubber or the like may also be dissolved in a proportion of several percent.

Other additives such as plasticizers for imparting flexibility to cured adhesive layers, modifiers for imparting impact resistance and heat resistance and dyes and pigments for identification of coating may also be added.

Because of containing a small amount of at least one of the compounds (1) to (6), the adhesive composition according to this invention exhibits an excellent storage stability and simultaneously has a higher bonding strength than the conventional adhesive compositions.

The adhesive composition according to this invention has a high setting rate (namely a short setting time) and is suitable for instantaneous adhesion of most materials such as rubbers, plastics, metals, wood and the like. The composition is used, for instance, for assembling small parts.

This invention is explained in more detail below referring to Examples. However, this invention should not be understood to be limited to the Examples. In the Examples and Comparative Examples, parts are by weight unless otherwise specified.

Examples 1 to 17 and Comparative Example 1

To 100 parts of ethyl 2-cyanoacrylate were added 0.05 part of hydroquinone and 0.002 part of each of the inhibitors shown in Table 1. Each of the adhesive compositions thus obtained was charged into a polyethylene container and then subjected to heating tests at 60° C. Results are shown in Table 1.

TABLE 1

| Example | Inhibitor | Setting time (iron) (sec) | Tensile shear strength of bond (iron) (Kgf/cm$^2$) | Heat gelation test at 60° C. |
|---|---|---|---|---|
| 1 | $CF_3CH_2OH$ | 10 | 200 | Stable for more than 35 days |
| 2 | $(CF_3)_2CHOH$ | 10 | 205 | Stable for more than 35 days |
| 3 | $(CF_3)_3COH$ | 10 | 205 | Stable for more than 46 days |
| 4 | $CF_3-CHOH$ with $CH_3$ | 10 | 200 | Stable for more than 35 days |
| 5 | $CF_3CF_2CH_2OH$ | 10 | 200 | Stable for more than 35 days |
| 6 | $HCF_2CF_2CH_2OH$ | 10 | 210 | Stable for more than 35 days |
| 7 | $C_6F_5OH$ | 10 | 210 | Stable for more than 43 days |
| 8 | $C_6F_5CH_2OH$ | 10 | 220 | Stable for more than 35 days |
| 9 | $(CF_3)_2C=O$ hydrate | 10 | 220 | Stable for more than 50 days |
| 10 | $(CCl_3)_2-C=O$ | 10 | 200 | Stable for more than 35 days |
| 11 | $CF_3CHO$ hydrate | 10 | 210 | Stable for more than 40 days |
| 12 | $CCl_3CHO$ | 10 | 190 | Stable for more than 35 days |
| 13 | $C_6F_5CHO$ | 10 | 195 | Stable for more than 43 days |
| 14 | $(CClF_2)_2-C=O$ hydrate | 10 | 200 | Stable for more than 45 days |

TABLE 1-continued

| | Inhibitor | Setting time (iron) (sec) | Tensile shear strength of bond (iron) (Kgf/cm²) | Heat gelation test at 60° C. |
|---|---|---|---|---|
| 15 | $C_3F_7\overset{\text{O}}{\underset{\|}{C}}CH_3$ | 10 | 200 | Stable for more than 40 days |
| 16 | $C_2F_5CHO$ | 10 | 205 | Stable for more than 43 days |
| 17 | $C_7F_{15}CH_2OH$ | 10 | 200 | Stable for more than 40 days |
| Comp. Ex. | | | | |
| 1 | $CH_3SO_3H$ | 15 | 180 | Gelled in 30 days |

Note: Measurements were made according to JIS K 6181.

Setting time:
  Time required until the bonding strength of iron reaches 5 Kgf/cm².
Tensile shear strength of bond:
  Iron test piece: 1.6×25×100 mm
  Bonded area: 3.125 cm².
Heat-gelation test:
  Period of time required until the adhesive thickened and gelled in a container at 60° C.

Examples 18 to 20 and Comparative Example 2

To 100 parts of methyl 2-cyanoacrylate were added 0.005 part of each of the inhibitors shown in Table 2 and 0.02 part of hydroquinone. Each of the resulting adhesive compositions was subjected to the same tests as in Example 1. Results are shown in Table 2.

TABLE 2

| | Inhibitor | Setting time (sec) | Tensile shear strength of bond (iron) (Kgf/cm²) | Heat-gelation test at 60° C. |
|---|---|---|---|---|
| Example | | | | |
| 18 | $(CF_3)_3COH$ | 10 | 270 | Stable for more than 40 days |
| 19 | $(CF_3)_2C=O$ hydrate | 10 | 275 | Stable for more than 40 days |
| 20 | $C_6F_5OH$ | 10 | 265 | Stable for more than 40 days |
| Comp. Example | | | | |
| 2 | $SO_2$ | 15 | 250 | Gelled in 30 days |

Examples 21 to 25 and Comparative Example 3

To 100 parts of isobutyl 2-cyanoacrylate were added 0.05 part of hydroquinone, 0.0005 part of $SO_2$ (inhibitor) and 0.002 part of each of the additional inhibitors shown in Table 3, and the resulting compositions were subjected to the same tests as in Example 1.

TABLE 3

| | Additional inhibitor | Setting time (sec) | Tensile shear strength of bond (iron) (Kgf/cm²) | Heat-gelation test at 60° C. |
|---|---|---|---|---|
| Example | | | | |
| 21 | $CF_3CH_2OH$ | 10 | 130 | Stable for more than 40 days |
| 22 | $CF_3CHO$ hydrate | 10 | 135 | Stable for more than 40 days |
| 23 | $(CF_3)_2CHOH$ | 10 | 130 | Stable for more than 40 days |
| 24 | $CF_3CF_2CH_2OH$ | 10 | 125 | Stable for more than 40 days |
| 25 | $(CCl_3)_2C=O$ | 10 | 125 | Stable for more than 40 days |
| Comp. Example | | | | |
| 3 | None ($SO_2$ alone) | 15 | 115 | Gelled in 35 days |

Examples 26 to 28 and Comparative Example 4

To isobutyl 2-cyanoacrylate containing 600 ppm of hydroquinone and 30 ppm of $SO_2$ (inhibitor) was added 1000 ppm of each of the additional inhibitors shown in Table 4. Using the resulting adhesive compositions aluminum tensile test pieces were bonded. The resulting assemblies were subjected to a water resistance test. That is, the test pieces were dipped in pure water maintained at 74° C. for 240 hours, taken out, and thereafter tested for tensile strength of bond.

The setting time of aluminum was 5 seconds.
Results are shown in Table 4.

TABLE 4

| | Additional inhibitor dipping | Tensile strength of bond (Kgf/cm²) | | Heat-gelation test at 60° C. |
|---|---|---|---|---|
| | | Before hours | After 240 hours 60° C. | |
| Example | | | | |
| 26 | Hexafluoroacetone | 210 | 122 | Stable for more than 40 days |
| 27 | Hexafluoroisopropanol | 205 | 115 | |
| 28 | Pentafluoroethyl ethyl ketone | 215 | 127 | |
| Comp. Ex. | | | | |
| 4 | None ($SO_2$ alone) | 198 | 52 | Gelled in 35 days |

Note: Measurements were made according to JIS K 6849.

Tensile strength of bond:
  Aluminum test piece:
  1.27×1.27×100 mm
  Bonded area: 1.61 cm²

What is claimed is:

1. An ahdesive composition which comprises 2-cyanoacrylate and at least one compound selected from the group consisting of the following compounds:

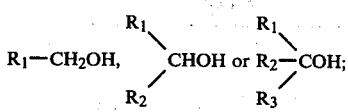
(1)

(2) $R_1$—CHO or $R_1$—CHO hydrate;

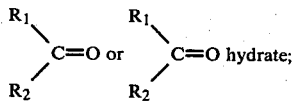
(3)

(4) pentafluorophenol;
(5) hexachloroacetone or hexachloroacetone hydrate; and
(6) chloral or chloral hydrate wherein $R_1$ is a fluorinated alkyl or aryl group having up to 12 carbon atoms, and $R_2$ and $R_3$ are fluorinated or non-fluorinated alkyl or aryl groups having up to 12 carbon atoms, as an anionic-polymerization inhibitor.

2. An adjesive composition according to claim 1, wherein the anionic polymerization inhibitor is at least one compound selected from the group consisting of the following compounds:

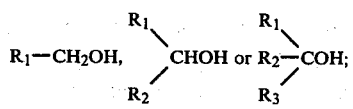
(1)

(2) $R_1$—CHO or $R_1$—CHO hydrate;

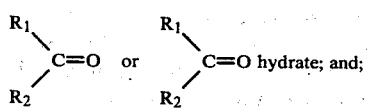
(3)

(4) pentafluorophenol.

3. An adhesive composition according to claim 1, wherein the anionic polymerization inhibitor is at least one compound selected from the group consisting of the following compounds:

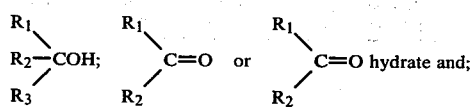
(1)            (2)

(3) pentafluorophenol.

4. An adhesive composition according to claim 1, wherein the anionic-polymerization inhibitor is at least one compound selected from the group consisting of trifluoroethanol, 1H,1H-pentafluoropropanol, 1H,1H-heptafluorobutanol, 1H,1H-nonafluoropentanol, 1,1,1-trifluoroisopropanol, hexafluoroisopropanol, octafluoro-sec-butanol, perfluoro-tert-butanol, hexafluoro-tert-butanol, 2-trifluoromethylpropanol-2, 1-chloro-1,1,3,3,3-pentafluoro-2-propanol, 3,3,4,4,4-pentafluorobutanol-2,3,3,4,5,5,5-hexafluoro-2-methylpentanol-2, 1H,1H,5H-octafluoro-1-pentanol, 1H,1H-pentadecafluorooctanol-1, trifluoroacetaldehyde, trifluoroacetaldehyde hydrate, heptafluorobenzaldehyde, 2,2,3,3,4,4-hexafluoro-1,5-pentanediol, pentafluorobenzyl alcohol, hexafluoroacetone, hexafluoroacetone hydrate, trifluoromethyl trichloromethyl ketone, pentafluoroethyl ethyl ketone, pentafluorophenyl methyl ketone, methyl heptafluoropropyl ketone, hexafluoro-2-phenylisopropanol, hexafluoro-2-(p-tolyl)isopropanol, pentafluorophenol, hexachloroacetone, hexachloroacetone hydrate, sym-dichlorotetrafluoroacetone and sym-dichlorotetrafluoroacetone hydrate.

5. An adhesive composition according to claim 1, wherein the anionic polymerization inhibitor is at least one compound selected from the group consisting of trifluoroethanol, 1H,1H-pentafluoropropanol, 1,1,1-trifluoroisopropanol, hexafluoroisopropanol, octafluoro-sec-butanol, perfluoro-tert-butanol, hexafluoro-tert-butanol, 2-trifluoromethylpropanol-2, 3,3,4,4,4-pentafluorobutanol-2, trifluoroacetaldehyde, trifluoroacetaldehyde hydrate, heptafluorobenzaldehyde, pentafluorobenzyl alcohol, hexafluoroacetone, hexafluoroacetone hydrate, trifluoromethyl trichloromethyl ketone, pentafluorophenyl methyl ketone and methyl heptafluoropropyl ketone.

6. An adhesive composition according to claim 1, wherein the anionic polymerization inhibitor is at least one compound selected from the group consisting of hexafluoroisopropanol, perfluoro-tert-butanol, trifluoroacetaldehyde, trifluoroacetaldehyde hydrate, hexafluoroacetone, hexafluoroacetone hydrate and pentafluorophenol.

7. An adhesive composition according to claim 1, wherein the anionic-polymerization inhibitor is $CF_3CH_2OH$, $(CF_3)_2CHOH$, $(CF_3)_3COH$,

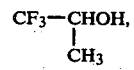

$CF_3CF_2CH_2OH$, $HCF_2CF_2CH_2OH$, $C_6H_5OH$, $C_6F_5CH_2OH$, $(CF_3)_2C=O$, $(CF_3)_2C=O$ hydrate, $(CCl_3)_2C=O$, $CF_3CHO$ hydrate, $CCl_3CHO$, $C_6F_5CHO$, $(CClF_2)_2C=O$ hydrate,

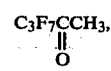

$C_2F_5CHO$, or $C_7F_{15}CH_2OH$, alone or in combination of $SO_2$.

8. An adhesive composition according to any one of claims 1 to 7, wherein 2-cyanoacrylate is available in the form of methyl 2-cyanoacrylate, ethyl 2-cyanoacrylate, propyl 2-cyanoacrylate, allyl 2-cyanoacrylate, butyl 2-cyanoacrylate, heptyl 2-cyanoacrylate, hexyl 2-cyanoacrylate, octyl 2-cyanoacrylate, decyl 2-cyanoacrylate, dodecyl 2-cyanoacrylate, 2-chloroethyl 2-cyanoacrylate, methyl Cellosolve 2-cyanoacrylate, ethyl Cellosolve 2-cyanoacrylate, butyl Cellosolve 2-cyanoacrylate, benzyl 2-cyanoacrylate, phenyl 2-cyanoacrylate, or trifluoroisopropyl 2-cyanoacrylate.

9. An adhesive composition according to claim 7, wherein 2-cyanoacrylate is available in the form of ethyl 2-cyanoacrylate, methyl 2-cyanoacrylate or isobutyl 2-cyanoacrylate.

10. An adhesive composition according to claim 1, wherein the anionic-polymerization inhibitor is contained in a quantity of 0.1 to 10,000 ppm.

11. An adhesive composition according to claim 1, wherein the anionic-polymerization inhibitor is contained in a quantity of 1 to 6,000 ppm.

* * * * *